US008931273B2

(12) United States Patent
Rollinger et al.

(10) Patent No.: US 8,931,273 B2
(45) Date of Patent: Jan. 13, 2015

(54) STORED COMPRESSED AIR MANAGEMENT FOR IMPROVED ENGINE PERFORMANCE

(75) Inventors: John Eric Rollinger, Sterling Heights, MI (US); Alex O'Connor Gibson, Ann Arbor, MI (US); Julia Helen Buckland, Commerce Township, MI (US); Robert Andrew Wade, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 13/474,509

(22) Filed: May 17, 2012

(65) Prior Publication Data

US 2013/0305718 A1 Nov. 21, 2013

(51) Int. Cl.
*F02B 33/44* (2006.01)

(52) U.S. Cl.
USPC ............ 60/611; 60/608; 60/684; 701/102; 701/110

(58) Field of Classification Search
CPC .. F02B 33/44; F02B 27/0247; F02B 27/0294; F02D 2200/602; F02D 41/307
USPC .............. 60/684, 608, 611; 701/102, 110
See application file for complete search history.

(56) References Cited

U.S. PATENT DOCUMENTS

| 4,592,319 | A | * | 6/1986 | Meistrick ..................... 123/321 |
| 4,689,960 | A | | 9/1987 | Schröder et al. | |
| 5,064,423 | A | * | 11/1991 | Lorenz et al. ................. 60/611 |
| 5,461,860 | A | | 10/1995 | Schegk | |
| 5,819,693 | A | | 10/1998 | Curtil | |
| 6,003,315 | A | | 12/1999 | Bailey | |
| 6,978,204 | B2 | * | 12/2005 | Surnilla et al. ............... 701/103 |
| 7,314,043 | B1 | * | 1/2008 | Berger et al. ................. 123/585 |
| 7,322,194 | B2 | | 1/2008 | Sun et al. | |
| 8,381,521 | B2 | * | 2/2013 | Schaffeld et al. ............. 60/608 |
| 2007/0246008 | A1 | | 10/2007 | Gerum | |
| 2010/0071658 | A1 | * | 3/2010 | Soejima et al. ......... 123/406.19 |
| 2011/0041496 | A1 | * | 2/2011 | Mayr ............................ 60/611 |
| 2011/0132335 | A1 | | 6/2011 | Pursifull et al. | |
| 2012/0221223 | A1 | * | 8/2012 | Schaffeld et al. ............ 701/102 |

FOREIGN PATENT DOCUMENTS

| EP | 0754843 A2 | 1/1997 |
| WO | 2011038240 A1 | 3/2011 |

OTHER PUBLICATIONS

Article "Driveability Evaluation for Engine Management Calibration" by J.J. Momberg Dated Mar. 2007.*
Rollinger, John Eric et al., "Boost Reservoir and Throttle Coordination," U.S. Appl. No. 13/474,513, filed May 17, 2012, 62 pages.

(Continued)

*Primary Examiner* — Thomas Denion
*Assistant Examiner* — Shafiq Mian
(74) *Attorney, Agent, or Firm* — Julia Voutyras; Alleman Hall McCoy Russell & Tuttle LLP (57) ABSTRACT

Methods and systems are provided for raising an exhaust temperature to spin a turbocharger turbine and reduce turbo-lag. Pressurized air is discharged from a boost reservoir into an intake manifold while spark retard is increased to expedite exhaust heating while also increasing a net combustion torque. By expediting turbine spin-up in response to a tip-in, turbo-lag is reduced and engine performance is improved.

20 Claims, 4 Drawing Sheets

(56) References Cited

OTHER PUBLICATIONS

Rollinger, John Eric et al., "Boost Reservoir Control," U.S. Appl. No. 13/474,472, filed May 17, 2012, 64 pages.
Rollinger, John Eric et al., "Boost Reservoir EGR Control," U.S. Appl. No. 13/474,495, filed May 17, 2012, 62 pages.
Rollinger, John Eric et al., "Coordination of CAM Timing and Blow-Through Air Delivery," U.S. Appl. No. 13/474,540, filed May 17, 2012, 44 pages.
Rollinger, John Eric et al., "Boost Air Management for Improved Engine Performance," U.S. Appl. No. 13/474,434, filed May 17, 2012, 62 pages.

* cited by examiner

STORED COMPRESSED AIR MANAGEMENT FOR IMPROVED ENGINE PERFORMANCE

TECHNICAL FIELD

This application relates to the field of motor-vehicle engineering, and more particularly, to air induction in motor vehicle engine systems.

BACKGROUND AND SUMMARY

A boosted engine may offer greater fuel efficiency and lower emissions than a naturally aspirated engine of similar power. During transient conditions, however, the power, fuel efficiency, and emissions-control performance of a boosted engine may suffer. Such transient conditions may include rapidly increasing or decreasing engine load, engine speed, or mass air flow. For example, when the engine load increases rapidly, a turbocharger compressor may require increased torque to deliver an increased air flow. Such torque may not be available, however, if the turbine that drives the compressor is not fully spun up. As a result, an undesirable power lag may occur before the intake air flow builds to the required level.

It has been recognized previously that a turbocharged engine system may be adapted to store compressed air and to use the stored, compressed air to supplement the air charge from the turbocharger compressor. For example, Pursifull et al. describe a system in US 2011/0132335 wherein compressed air is stored in a boost reservoir and is dispensed when insufficient compressed air is available from the turbocharger compressor. By dispensing extra compressed air from the boost reservoir, torque corresponding to the dispensed air can be provided to meet the torque demand while the turbine spins up.

However, the inventors herein have identified potential issues with such a system. As one example, turbo-lag may not be sufficiently addressed even after using the dispensed air to generate torque due to low exhaust temperatures that delay the spin-up of the turbine. For example, if the boost level at the time of the tip-in is higher than a threshold, the torque compensation via the dispensed air may be sufficient to address the turbo lag. However, if the boost level at the time of the tip-in is lower than the threshold, the turbine speed may be low, and the torque compensation via the dispensed air may not be sufficient to address the turbo lag. As another example, if the boost reservoir has a small volume, the boost air may be used up relatively fast, in particular at high engine speeds, and there may not enough time to address the turbo lag. As such, engine performance may be degraded.

Thus, at least some of the above issues may be addressed by a method for a turbocharged engine comprising, in response to a tip-in, raising exhaust temperature by discharging pressurized air from a boost reservoir to an intake manifold while retarding spark ignition timing. In this way, turbine speed can be rapidly raised.

For example, in response to a tip in, an engine controller may raise the exhaust temperature by discharging an amount of pressurized air from a boost reservoir outside of a valve overlap period (e.g., during an intake or compression stroke) while retarding spark by an amount based on the discharged amount of pressurized air. As a result, the air-fuel mixture may combust in the cylinder, leading to elevated exhaust gas temperatures and expediting turbine spin-up. The amount of spark retard used may be limited such that a net engine combustion torque is maintained or increased. Consequently, turbo lag may be reduced while at least some torque compensation is provided. Overall, engine performance is improved.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

Figure 1:
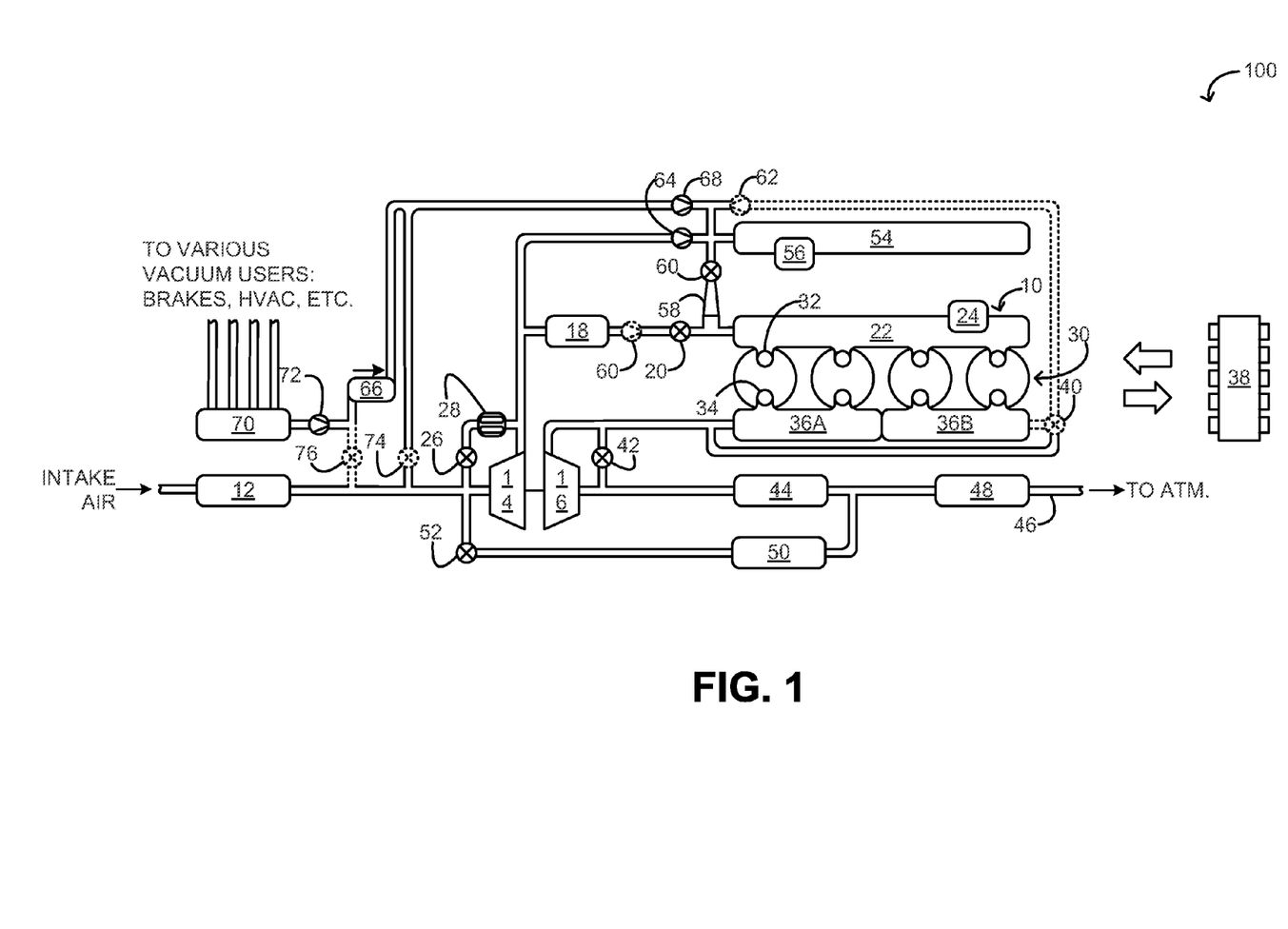
FIG. 1 schematically shows aspects of an example engine system in accordance with an embodiment of this disclosure.

The following description relates to systems and methods for reducing turbo lag in a boosted engine, such as in the engine of FIG. 1, including a boost air reservoir. By discharging air from the boost reservoir to the intake manifold while retarding spark, exhaust gas temperatures can be quickly raised, and a boosting device turbine can be rapidly spun-up. An engine controller may be configured to perform a control routine, such as the example method of FIG. 2, in response to a tip-in event, to discharge or release compressed air from the reservoir into the intake manifold while retarding spark outside of a valve overlap period (FIG. 3). The air-fuel mixture may be combusted in the engine cylinders to generate heated exhaust gas that is then used to spin up a turbine. By adjusting the amount of spark retard based on the amount of pressurized air that is discharged from the boost reservoir, exhaust gas temperatures may be raised while also increasing a net combustion torque. Example adjustments are shown with reference to FIG. 4. By increasing the exhaust temperature, and expediting turbine spin-up, turbo lag may be reduced and the boost performance of the engine may be improved.

FIG. 1 schematically shows aspects of an example engine system 100 including an engine 10. In the depicted embodiment, engine 10 is a boosted engine coupled to a turbocharger 13 including a compressor 14 driven by a turbine 16. Specifically, fresh air is introduced into engine 10 via air cleaner 12 and flows to compressor 14. The compressor may be any suitable intake-air compressor, such as a motor-driven or driveshaft driven supercharger compressor. In engine system 10, however, the compressor is a turbocharger compressor mechanically coupled to turbine 16, the turbine driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed. As shown in FIG. 1, compressor 14 is coupled, through charge-air cooler 18 to throttle valve 20. Throttle valve 20 is coupled to engine intake manifold 22. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24.

In engine system 10, compressor by-pass valve 26 and fixed flow restrictor 28 are coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

In one embodiment, compressor by-pass valve 26 may be a two-state valve having a fully open state and a fully closed state. Therefore, as shown in FIG. 1, fixed flow restrictor 28 is coupled in series with the compressor by-pass valve. In one embodiment, the fixed flow restrictor may be an orifice-type flow restrictor; in another embodiment, it may be a laminar-flow type flow restrictor comprising one or more laminar-flow elements. In either case, the fixed flow restrictor may be configured so that when the compressor by-pass valve is opened, sufficient air flow is discharged from the outlet to the inlet to prevent surge, while still allowing some boost pressure to accumulate at the outlet. Accordingly, the dimensions of the fixed flow restrictor may be chosen to keep as much pressure downstream of compressor 14 as possible, so as to provide rapid re-pressurization while keeping the compressor out of surge conditions.

Intake manifold 22 is coupled to a series of combustion chambers 30 through a series of intake valves 32. The combustion chambers are further coupled to one or more exhaust manifold sections via a series of exhaust valves 34. In the depicted embodiment, exhaust manifold sections 36A and 36B are shown. Other embodiments may include more or fewer exhaust manifold sections. Configurations having more than one exhaust manifold section may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

FIG. 1 shows electronic control system 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system—throttle valves, compressor by-pass valves, waste gates, EGR valves and shut-off valves, for example—as needed to enact any of the control functions described herein. Further, to assess operating conditions in connection with the control functions of the engine system, the electronic control system may be operatively coupled to a plurality of sensors arranged throughout the engine system—flow sensors, temperature sensors, pedal-position sensors, pressure sensors, etc.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

In embodiments where fuel is supplied by direct injection, different combustion chambers 30 may be charged with unequal amounts of fuel during selected operating conditions. For instance, engine system 10 may be configured for a DFSO mode, where some of the combustion chambers receive no fuel and merely pump the air admitted through their respective intake valves. Under such conditions, the engine system may be configured to store the air pumped and thereby compressed by the unfueled combustion chambers. Accordingly, FIG. 1 shows two-way valve 40 coupled to exhaust manifold section 36B. When the combustion chambers coupled to exhaust manifold section 36B are unfueled due to DFSO operation, the two-way valve may be positioned to direct the effluent of the combustion chambers—i.e., the pumped, compressed air—to a locus of the engine system where the air can be stored. In this manner, one or more unfueled combustion chambers of the engine may be used as an air pump—a functional equivalent of other air pumps described hereinafter. Under other conditions, when the combustion chambers coupled to exhaust manifold section 36B are fueled, the two-way valve may be positioned to direct the effluent of the combustion chambers to turbine 16.

As shown in FIG. 1, exhaust from the one or more exhaust manifold sections is directed to turbine 16 to drive the turbine. When reduced turbine torque is desired, some exhaust may be directed instead through waste gate 42, by-passing the turbine. The combined flow from the turbine and the waste gate then flows through exhaust after-treatment stage 44. In general, one or more exhaust after-treatment stages may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow.

All or part of the treated exhaust from exhaust after-treatment stage 44 may be released into the atmosphere via exhaust conduit 46, in which silencer 48 is also coupled. Depending on operating conditions, however, some treated exhaust may be diverted instead through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 10 is adapted to provide external, low-pressure (LP) EGR. The rotation of the compressor, in addition to the relatively long LP EGR flow path in engine system 10, provides excellent homogenization of the exhaust gas into the intake air charge. Further, the disposition of EGR take-off and mixing points provides very effective cooling of the exhaust gas for increased available EGR mass and improved performance. As shown in FIG. 1, the recirculated exhaust traverses exhaust after-treatment device 44, EGR cooler 50, as well as charge-air cooler 18.

In engine system 10, compressor 14 is the primary source of compressed intake air, but under some conditions, the amount of intake air available from the compressor may be inadequate. Such conditions include periods of rapidly increasing engine load, such as immediately after start-up, upon tip-in, or upon exiting DFSO. During at least some of these conditions, the amount of compressed intake air available from the compressor may be limited due to the turbine not being spun up to a sufficiently high rotational speed. As such, the time required for the turbine to spin up and drive the compressor to provide the required amount of compressed intake air is referred to as turbo lag. During turbo-lag, the amount of torque provided may not match the torque demand, leading to a drop in engine performance.

In view of the issues noted above, engine system 100 includes boost reservoir 54. The boost reservoir may be any reservoir of suitable size configured to store compressed air for later discharge. In one embodiment, the boost reservoir may be configured to store air at the maximum pressure generated by compressor 14. Various inlets, outlets, and sensors may be coupled to the boost reservoir. In the embodiment shown in FIG. 1, pressure sensor 56 is coupled to the boost reservoir and configured to respond to the air pressure therewithin.

In engine system 100, boost reservoir 54 is selectably coupled to intake manifold 22. More specifically, the boost reservoir is configured to discharge compressed air to the intake manifold via boost reservoir discharge valve 60. The boost reservoir discharge valve may be a normally closed valve commanded to open when a flow of air from the boost reservoir to the intake manifold is desired. In the embodiment shown in FIG. 1, pressure recovery cone 58 is coupled fluidically between the boost reservoir and the intake manifold. Accordingly, compressed air is conducted through the pressure recovery cone on discharge from the boost reservoir. The pressure recovery cone may be any section of conduit having a gradually increasing cross-sectional area normal to the direction of flow. The pressure recovery cone may be installed anywhere between the boost reservoir and the intake manifold and may be bent into a curved (e.g., nautilus) shape if needed for efficient packing. Compared to the same length of conduit having a constant cross-sectional area, the pressure recovery cone converts flow energy back to pressure energy during flow conditions by suppressing flow detachment from the conduit walls. In one embodiment, pressure recovery cone 58 may have a 15 degree cone angle and may reduce the flow rate of the compressed air from 200 meters per second to 50 meters per second. Based on known principles of fluid dynamics, this reduction in flow rate may conserve 47 kilopascals of pressure for air initially pressurized to 200 kilopascals. In alternate embodiments, however, the pressure recovery cone may not be included.

Compressed air from boost reservoir 54 is delivered downstream of throttle valve 20. In some scenarios, the compressed air may be delivered when the throttle valve is at least partially open. Therefore, check valve 60 may be coupled upstream of the throttle valve and oriented to prevent the release of compressed air from the boost reservoir backwards through the throttle valve. In other embodiments, the check valve may be omitted and other measures taken to prevent backwards flow through the throttle valve.

As noted hereinabove, the pumping of air by unfueled combustion chambers of the engine during DFSO provides one way to charge boost reservoir 54 with compressed air. In the embodiment shown in FIG. 1, two-way valve 40 may be oriented such that effluent from one or more unfueled cylinders flows through check valve 62 and into the boost reservoir. The check valve allows compressed air from exhaust manifold section 36B to be stored in the boost reservoir but prevents stored compressed air from flowing back to the exhaust manifold section.

The turbocharged engine system 100 may include still other structures to enable a boost reservoir to be filled under selected operating conditions. For example, boost reservoir 54 is shown coupled to compressor 14 via check valve 64. The check valve allows compressed air from the compressor to flow into the boost reservoir under conditions of high throttle-inlet pressure (TIP) and to be stored therein, but it prevents stored compressed air from flowing back to the compressor under conditions of low TIP.

Boost reservoir 54 is further coupled to air pump 66 via check valve 68. This check valve allows compressed air from the air pump to flow into and be stored in the boost reservoir when the outlet pressure of the air pump is high, but it prevents stored compressed air from flowing back to the air pump when the outlet pressure is low. Air pump 66 may be virtually any air pump of the vehicle in which engine system 10 is installed. In one embodiment, the air pump may be driven by an electric motor. In another embodiment, the air pump may be driven by a crankshaft or other rotating or reciprocating shaft of the engine system. In another embodiment, the air pump may be driven by a wheel of the vehicle in which the engine system is installed. In yet another embodiment, the air pump may be an exhaust-driven or compressor-driven pressure amplifier—i.e., a gas-flow driven air compressor.

In the particular embodiment illustrated in FIG. 1, air pump 66 is further coupled to vacuum manifold 70 of engine system 10 via check valve 72. Accordingly, air pump 66 may be configured to operate as a vacuum pump under certain operating conditions and as a pressure pump under other operating conditions. During both conditions, the air pump is operated so as to impel air from the side coupled to check valve 72 to the side coupled to check valve 68. For vacuum operation, shut-off valve 74 is opened, and shut-off valve 76 is closed. The vacuum manifold is thereby evacuated, providing vacuum for braking and other vehicle operations. In this configuration, the air pump presents minimal mechanical or electrical load on the engine system. For pressure operation, shut off valve 76 is opened, and shut-off valve 74 is closed. Boost reservoir 54 is thereby pressurized with air drawn from air cleaner 12.

It will be appreciated that still other embodiments of engine system 100 may be possible. For example, in one embodiment, boost tank 54 may be coupled upstream, not downstream, of throttle valve 20. In another embodiment, boost tank 54 may be coupled to pressure recovery cone 58 via an air ejector (not shown). The air ejector may have a primary inlet coupled to the boost tank via boost tank discharge valve 60, an outlet coupled to intake manifold 22, and a secondary inlet arranged off of the main flow. When air flows from the primary inlet through to the outlet, a partial vacuum develops at the secondary inlet, causing additional air to be drawn in and discharged from the outlet. Although the air charge provided to the intake manifold will be lower in pressure than the air discharged from the boost tank, the overall air mass delivered may be significantly greater. Using the air ejector in this manner offers at least two advantages in engine systems having a boost tank. First, the volume of the boost tank may be decreased to save space, while maintaining the overall amount of available boost. Second, the time required to fill the boost tank may be reduced in view of its lower volume.

In the various engine systems discussed above, and in others fully consistent with this disclosure, pressurizing air or an air/exhaust mixture in a boost tank may cause water vapor to condense inside the boost tank. Therefore in some embodiment, a drain valve (not shown) may be coupled to boost tank 54. The drain valve may be opened as needed to drain condensate from the boost tank onto the road surface below the vehicle in liquid form, or directed to the exhaust system of the vehicle, evaporated, and discharged as a vapor. In one embodiment, the drain valve may be an electronically controlled, normally closed valve configured to open at the command of electronic control system 38. The electronic control system may be configured to command the draining of the condensate at a time when the condensate is unfrozen, and when draining event is unlikely to be noticed by the occupants of the vehicle, for example, after a noise or speed level in the vehicle is above a threshold and the condensate is (or is predicted to be) unfrozen.

The configurations described above enable various methods for providing air to a combustion chamber of an engine. Accordingly, some such methods are now described, by way of example, with continued reference to the above configuration. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command selectively, in response to the decision-making events.

In the configurations described above, compressed air for filling a boost tank may be supplied via a turbocharger compressor under some conditions and via one or more air pumps under other conditions. Such configurations enable air stored in the boost tank to be discharged in response to at least a tip-in condition, where the throttle valve opens suddenly and the compressor is spinning too slowly to provide the desired MAP. As elaborated herein below, during at least some tip-in conditions (such as when the boost level at tip-in is lower and anticipated turbo lag is higher), while discharging air from the boost reservoir, a higher amount of spark retard may be used to rapidly raise the temperature of exhaust gas and expedite turbine spin-up. During other tip-in conditions (such as when the boost level at tip-in is higher and anticipated turbo lag is lower), while discharging air from the boost reservoir, a smaller amount of spark retard (e.g., no spark retard) may be used to provide additional engine torque (corresponding to the discharged amount of boost air) to meet the torque demand while the compressor reaches the desired capacity.

In some embodiments, at least some cylinders of the engine may be configured to have spark timing retarded while boost air is discharged into the intake manifold for purposes of heating exhaust gas and expediting turbine spin. At the same time, other cylinders may be configured to maintain ignition timing while boost air is discharged for the purposes of torque generation. To reduce potential issues arising from a torque differential between the cylinders, the cylinders enabling exhaust gas heating and the cylinder enabling torque generation may be selected based their firing order. In this way, by expediting turbine spin-up, while providing torque, turbo lag can be reduced while increasing net engine combustion torque.

Figure 2:
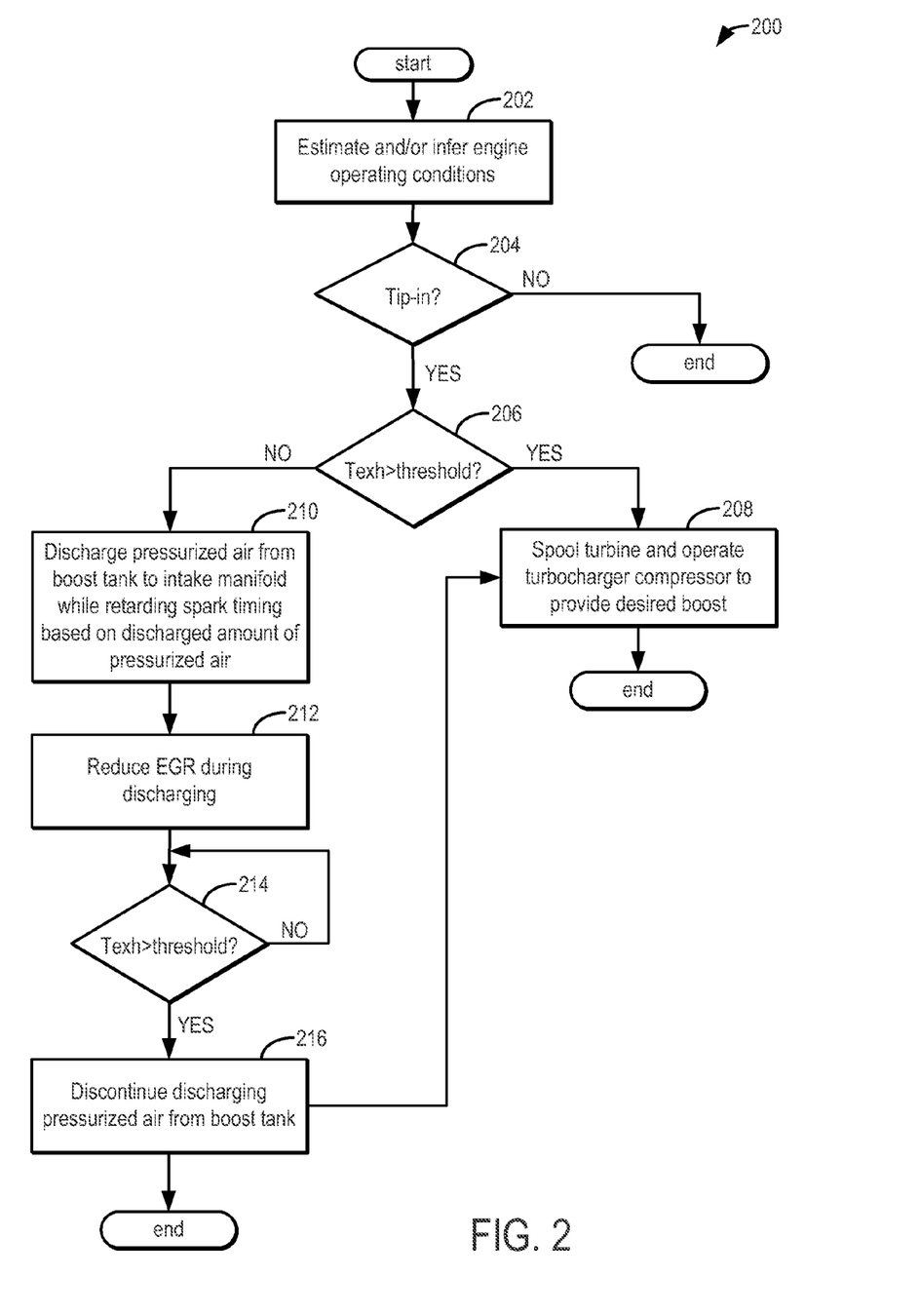
FIG. 2 illustrates an example method for discharging pressurized air from a boost reservoir while retarding spark to expedite turbine spin-up, according to the present disclosure.
Figure 3:
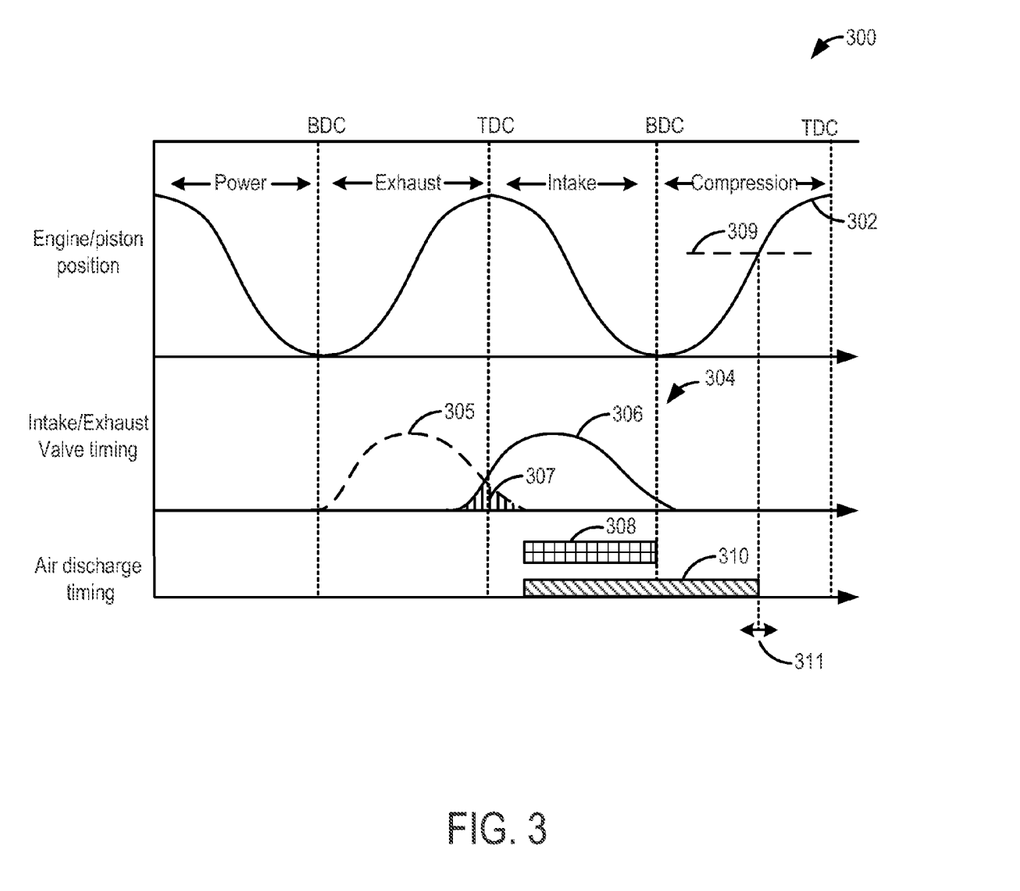
FIG. 3 shows a map depicting example engine timings at which pressurized air may be discharged while retarding spark to expedite exhaust heating.

Now turning to FIG. 2, an example method 200 is shown for enabling discharge of pressurized air from a boost reservoir while retarding spark so as to heat exhaust gas and expedite turbine spin-up. In this way, the method enables turbo lag to be reduced.

At 202, the method includes estimating and/or measuring engine operating conditions. These may include, for example, engine speed, driver torque demand, engine coolant temperature, exhaust temperature, boost reservoir air level, etc. At 204, it may be determined if a tip-in condition is present. In one example, a tip-in may be confirmed if an accelerator pedal position is moved beyond a threshold position or if the position is changed at a rate higher than a threshold rate. In another example, the tip-in may be confirmed based on a change in throttle valve position or a change in intake airflow rate. As such, if no tip-in is confirmed, the routine may end.

If a tip-in is confirmed, then at 206, it may be determined if the temperature of the exhaust gas (Texh) is higher than a threshold. Herein, the threshold exhaust gas temperature may correspond to a temperature above which the turbine can be spooled and spun-up so as to drive the compressor and provide a desired boost. For example, the threshold temperature may be based on a turbine speed. Thus, if the exhaust temperature is above the threshold temperature, at 208, the turbine may be spooled and the turbocharger compressor may be operated to provide the required amount of boost to meet the torque demand.

In comparison, if the exhaust gas temperature is below the threshold temperature, there may be a delay in spinning up the turbine and driving the compressor. Accordingly, at 210, in response to the tip-in, the method includes raising exhaust temperature by discharging pressurized air from the boost reservoir to the engine intake manifold while retarding spark ignition timing. Herein, the spark retard used is based on the amount of pressurized air discharged from the boost reservoir. However, the applied spark retard is less than a spark retard limit based on a combustion torque corresponding to the discharged amount of pressurized air. That is, spark may not be retarded beyond an amount that reduces the net combustion torque. For example, the spark retard may maintain or increase torque above the torque level generated during cylinder operation in the absence of supplementary pressurized air discharged from the boost reservoir. This allows a net combustion torque of the engine to be increased, or at least maintained, during the retarding of ignition timing.

As elaborated with reference to FIG. 3, the discharging may occur outside of a valve overlap period. For example, the discharging may occur during an intake stroke and/or a compression stroke. As such, this allows the air-fuel mixture to be combusted in the cylinder (during a first combustion event) such that upon release, the heated exhaust gas can be used to spool the turbine on a second combustion event immediately following the first combustion event. By discharging the pressurized gas outside of the overlap period, rather than within the overlap period, more air-fuel mixing can be achieved and better exhaust gas heating may be achieved.

At 212, during the discharging, an amount of exhaust gas recirculated from the exhaust manifold to the intake manifold may be reduced. In particular, the reducing of EGR may be based on the discharged amount of pressurized air. This allows the combustion stability to be improved and increased spark retard to be used for heating exhaust gas. In one example, where the engine system has an EGR passage including an EGR valve for recirculating an amount of exhaust gas from the engine exhaust manifold to the engine intake manifold, an engine controller may reduce an opening of the EGR valve to reduce the amount of exhaust gas recirculated to the engine intake via the EGR passage.

At 214, the exhaust gas temperature may be reassessed to determine if the exhaust gas temperature is now higher than the threshold temperature after the discharging of pressurized air while retarding spark timing. If not, the discharging while retarding is continued until the exhaust temperature is above the threshold temperature. Upon confirmation that the exhaust gas is sufficiently hot, at 216, the discharging of pressurized air from the boost reservoir may be discontinued. The routine may then proceed to 208 to spool the turbine and operate the turbocharger to provide the required boost and meet the torque demand.

It will be appreciated that while FIG. 2 discusses retarding spark in all engine cylinders while discharging air into the engine intake manifold, in alternate embodiments, the controller may be configured to discharge pressurized air from the boost air reservoir to an engine intake manifold while increasing spark retard in a first engine cylinder (or a first number or group of engine cylinders) while maintaining spark timing in a second engine cylinder (or a second number of engine cylinders). At the same time, a net engine combustion torque may be increased. In this embodiment, the first engine cylinder (or first number or group of cylinders) and the second engine cylinder (or second number or group of cylinders) may be selected based on the cylinder firing order so as to reduce a torque differential between the cylinders. In particular, by retarding spark in some cylinders while maintaining spark timing in other cylinders, the cylinders with spark retard may use the discharged pressurized air to heat the exhaust and spin the turbine, while the cylinders without spark retard may use the discharged pressurized air to generate supplementary torque to meet the torque demand.

In one example, the engine system may have a twin turbocharger including a first turbine coupled to a first group of engine cylinders and a second turbine coupled to a second group of engine cylinders. Herein, the first cylinder wherein spark is retarded may be included in the first group of engine cylinders while the second cylinder wherein spark is maintained may be included in the second group of engine cylinders. Further, a temperature of the first turbine may be higher than a temperature of the second turbine. Consequently, the turbo lag anticipated during operation of the first turbine may be higher than the turbo lag anticipated during operation of the second turbine. Thus, to address the differences in turbo lag, pressurized air may be discharged from the boost reservoir while retarding spark in the first cylinder (for the purposes of generating heat and reducing turbo lag) and while maintaining spark in the second cylinder (for the purposes of generating additional torque and reducing turbo lag). As such, the increased spark retard may be based on the discharged amount of pressurized air while limiting the spark retard to an amount lower than a spark retard limit based on combustion torque. That is, spark may not be retarded beyond an amount that reduces the net combustion torque below the torque level generated during cylinder operation in the absence of the supplementary pressurized air discharged from the boost reservoir.

It will also be appreciated that while the above method indicates that the pressurized boost reservoir air is directed to the intake manifold, in alternate embodiments, the engine system may be configured to enable the pressurized air discharged from the boost reservoir to be directed to individual cylinders, or cylinder groups. Herein, the amount of air directed to each cylinder may be better controlled. Further, more time may be available to mix and combust the air-fuel mixture and generate heat. In those embodiments, by adjusting the timing of discharge of the pressurized air from the boost reservoir with the ignition timing, or spark retard, further control of torque and turbo lag may be achieved.

Now turning to FIG. 3, map 300 depicts example valve timings during when pressurized air may be discharged from the boost air reservoir while spark is retarded to enable exhaust gas heating. Air discharge timing is illustrated at 306 and compared to intake and exhaust valve timings at 304. The air discharge timing is further compared to an engine position illustrated along the x-axis in crank angle degrees (CAD), a piston position along the y-axis with reference to their location from top dead center (TDC) and/or bottom dead center (BDC), and further with reference to their location within the four strokes (intake, compression, power and exhaust) of an engine cycle at curve 302. As indicated by sinusoidal curve 302, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

At 304, a standard valve timing is depicted. In particular, curves 305 and 306 depict valve timings for an exhaust valve (dashed curve 305) and an intake valve (solid curve 306) at a standard (unadjusted) valve timing. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 307 (or simply, valve overlap), represented by a hatched region at the intersection of curves 305 and 306.

To enable rapid exhaust gas heating, pressurized air may be discharged from the boost reservoir while retarding spark timing. In particular, the pressurized air may be discharged at an air discharge timing such that discharging occurs outside of valve overlap period 307. As such, this allows the air-fuel mixture to be combusted within the cylinder and used for spooling the turbine upon release into the exhaust manifold. In comparison, if the air were discharged during valve overlap, the compressed air may travel through and out the cylinders into the exhaust, without properly mixing with the fuel. As a result, sufficient combustion for raising exhaust gas temperature may not be achieved.

In one example, such as when the boost air is discharged into the intake manifold, the discharging may occur at an air discharge timing that is any time during interval 308 which covers an interval that is during the intake stroke but after valve overlap 307 has ended. In another example, such as when the boost air is discharged directly into the cylinders, the discharging may occur at an air discharge timing that is any time during interval 310 which covers an interval that is during the intake stroke, after valve overlap 307 has ended, and at least a part of the compression stroke. In particular, interval 310 may cover up to an adjustable timing 311 of the compression stroke wherein timing 311 is based on a pressure in the boost tank. Specifically, as compression stroke progresses, a pressure in the cylinder may start to increase. Above a threshold piston position 309, the pressure in the cylinder may become higher than the pressure in the boost air reservoir, and may cause the air-fuel mixture to flow back towards the intake manifold. Thus, as the boost pressure in the reservoir decreases, timing 311 may be adjusted to be later in the compression stroke (that is, closer to compression stroke TDC and further from compression stroke BDC). Consequently, air may be discharged for a longer interval 310 including the intake stroke (outside of valve overlap) and a larger portion of the compression stroke. In comparison, when the boost pressure in the reservoir is higher, timing 311 may be adjusted to be earlier in the compression stroke (that is, closer to compression stroke BDC and further from compression stroke TDC). Consequently, air may be discharged for a shorter interval 310 including the intake stroke (outside of valve overlap) and a smaller portion of the compression stroke.

Figure 4:
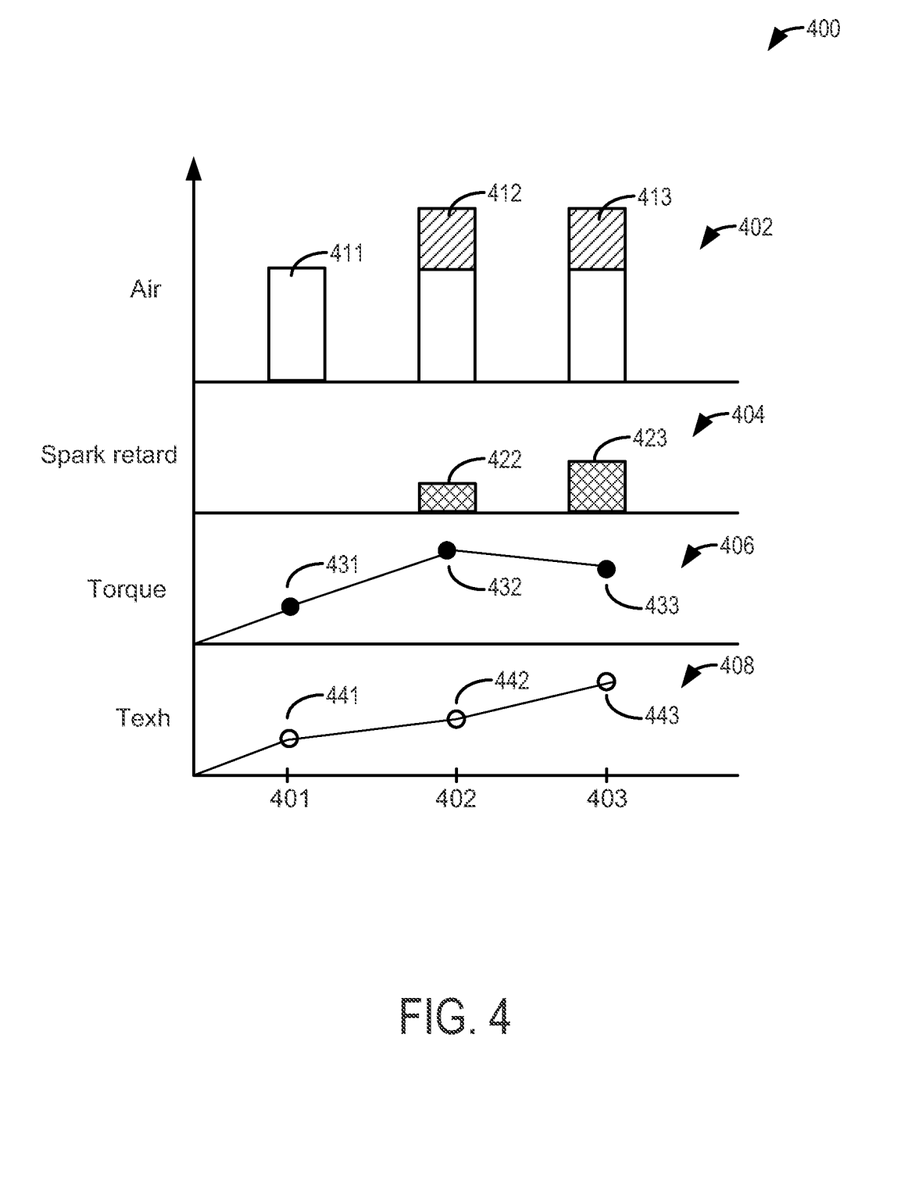
FIG. 4 shows example combinations of air discharge from a boost reservoir with spark retard for reducing turbo lag.

Now turning to FIG. 4, map 400 illustrates example combinations of discharging pressurized air from a boost reservoir with varying amount of spark retard (at 401-403), in response to a tip-in. In particular map 400 shows intake manifold air at 402, spark retard amounts at 404, resulting net combustion torque at 406, and resulting exhaust gas temperature at 408.

In particular, examples 402-403 compare torque and heat generated using a combination of spark retard and boost air discharge to example 401 wherein no spark is retarded and no additional boost air is discharged. In example 401, the engine is operated with intake air that may be pressurized upon passage through a compressor (as represented by solid graph 411) but without the addition of any further boost air from a boost reservoir. No spark retard may be used. As a result, net combustion torque 431 may be generated and the exhaust temperature may be raised to a first temperature 441.

Example 402 depicts an adjustment performed in response to a first tip-in. During the first tip-in, in addition to the intake air provided via the compressor, the controller may discharge an amount of pressurized air (depicted by hashed region 412) from the boost reservoir to the intake manifold, downstream of the compressor with a first, smaller amount 422 of spark retard. As a result, net combustion torque 432 may be generated and the exhaust temperature may be raised to a second temperature 442. Herein, both the net combustion torque and the exhaust temperature may be raised as compared to the levels obtained in the absence of discharged air and spark retard (example 401).

Example 403 depicts an adjustment performed in response to a second tip-in. During the second tip-in, an air level in the boost reservoir may be lower than the air level in the boost reservoir during the first tip-in. Alternatively, during the first tip-in, the boost reservoir may be a first, smaller boost reservoir while during the second tip-in, the boost reservoir may be a second, larger boost reservoir. In still another example, during the first tip-in, a boost level at the time of tip-in may be higher while during the second tip-in, the boost level at time of tip-in may be lower. Consequently, during the first tip-in, an amount of turbo lag may be lower (e.g., lower than a threshold) while during the second tip-in, the amount of turbo lag may be higher (e.g., higher than the threshold). To address the higher turbo lag, the amount of spark retard used in combination with the discharged pressurized air may be adjusted to enable a higher exhaust temperature to be attained, thereby expediting turbine spin up during the second tip-in.

Accordingly, during the second tip-in, in addition to the intake air provided via the compressor, the controller may discharge an amount of pressurized air (depicted by hashed region 413) from the boost reservoir to the intake manifold with a second, larger amount 423 of spark retard. As a result, net combustion torque 433 may be generated and the exhaust temperature may be raised to a third temperature 443. Herein, both the net combustion torque and the exhaust temperature may be raised as compared to the levels obtained in the absence of discharged air and spark retard (example 401). However, net combustion torque 433 (generated with use of the larger amount of spark retard) may be lower than net combustion torque 432 (generated with use of the smaller amount of spark retard), but third exhaust temperature 443 may be higher than second exhaust temperature 442.

As such, during each of the first and second tip-ins, the first and second amount of spark retard applied (spark retards 422, 423) may be adjusted to be lower than a spark retard limit that is based on a combustion torque corresponding to the discharged pressurized air. That is, spark retards 422, 423 may be adjusted to allow net combustion torques 432 and 433 to be maintained at, or increased above, net combustion torque 421 attained in the absence of any discharged pressurized boost air.

It will be appreciated that while example 402 depicts a first tip-in with some amount of spark retard (albeit smaller than the amount of spark retard used in example 403), in an alternate embodiment, example 402 may include a combination wherein spark timing is maintained and no spark retard is applied while boost air is discharged from the boost reservoir. Herein, the net combustion torque generated may be increased to enable the tip-in torque demand to be (at least temporarily) met, however the increase in exhaust gas temperature may not be sufficient to reduce turbo lag. It will also be appreciated that while examples 402 and 403 depict use of the same amount of discharged pressurized air, in alternate embodiments, the amount of discharged air may be varied. In particular, by varying the amount of boost air that is discharged from the boost reservoir, while varying the amount of spark retard applied during the discharging, an engine controller may increase the net combustion torque while elevating the exhaust gas temperature, wherein a preference for the increase in combustion torque relative to the increase in exhaust temperature is made based at least on the boost level (or turbine speed) at the time of tip-in.

In this way, by delivering an amount of pressurized air that is discharged from a boost air reservoir while retarding an amount of spark retard, exhaust gas temperature may be rapidly raised to enable turbine spin-up and reduction of turbo lag. By using more spark retard when available boost levels are lower, relatively more exhaust heat and relatively less combustion torque may be generated to quickly spin-up the turbine. By using less spark retard when available boost levels are higher, relatively less exhaust heat and relatively more combustion torque may be generated to meet an elevated torque demand. In this way, turbo lag may be better addressed and the performance of a boosted engine may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a boosted engine, comprising:
during a first tip-in, discharging pressurized air from a boost reservoir to an intake manifold downstream of a compressor with a first, smaller amount of spark retard; and
during a second tip-in, discharging pressurized air from the boost reservoir to the intake manifold with a second, larger amount of spark retard.

2. The method of claim 1, wherein during the second tip-in, an air level in the boost reservoir is lower than an air level in the boost reservoir during the first tip-in.

3. The method of claim 1, wherein during the first tip-in, the boost reservoir is a first, smaller boost reservoir and during the second tip-in, the boost reservoir is a second, larger boost reservoir.

4. The method of claim 1, wherein during the first tip-in, a boost level at time of the first tip-in is higher and wherein during the second tip-in, the boost level at time of the second tip-in is lower.

5. The method of claim 1, wherein during the first tip-in, an amount of turbo lag is lower than a threshold, and wherein during the second tip-in, the amount of turbo lag is higher than the threshold.

6. The method of claim 1, wherein each of the first and second amount of spark retard are lower than a spark retard limit, the spark retard limit based on a combustion torque corresponding to the discharged pressurized air.

7. The method of claim 1, further comprising;
reducing an amount of exhaust gas recirculated from an exhaust manifold to the intake manifold based on an amount of discharged pressurized air.

8. The method of claim 1, wherein discharging pressurized air from the boost reservoir raises an exhaust temperature.

9. The method of claim 1, further comprising, determining if exhaust gas temperature is above a threshold temperature.

10. The method of claim 1, wherein discharging occurs outside of a valve overlap period.

11. The method of claim 1, wherein discharging occurs during an intake stroke or a compression stroke.

12. The method of claim 1, wherein the first amount of spark retard increases a net combustion torque of the engine.

13. The method of claim 9, wherein exhaust gas temperature is determined based on turbine speed.

14. The method of claim 9, wherein discharging occurs when exhaust temperature is below the threshold temperature.

15. An engine system, comprising:
an engine;
a turbocharger including a compressor driven by a turbine;
a boost air reservoir coupled downstream of the compressor; and
a controller with computer readable instructions for,
in response to a tip-in,
discharging pressurized air from the boost air reservoir to an engine intake manifold while increasing spark retard in a first engine cylinder and while maintaining spark timing in a second engine cylinder, and further while increasing net engine combustion torque.

16. The system of claim 15, wherein the first engine cylinder and the second engine cylinder are selected based on a cylinder firing order.

17. The system of claim 15, wherein increasing spark retard includes increasing spark retard by an amount based on the discharged pressurized air, the amount lower than a spark retard limit based on combustion torque.

18. The system of claim 15, further comprising an EGR passage including an EGR valve for recirculating an amount of exhaust gas from an engine exhaust manifold to the engine intake manifold, wherein the controller includes further instructions for reducing an amount of exhaust gas recirculated to the engine intake via the EGR passage by reducing an opening of the EGR valve.

19. The engine system of claim 15, further comprising a pressure recovery cone coupled fluidically between the boost air reservoir and the engine intake manifold.

20. The engine system of claim 15, further comprising an air pump that supplies compressed air to the boost air reservoir.

* * * * *